Oct. 18, 1927.  
J. F. KOHLER  
1,645,600  
COCONUT SHELLING MACHINE  
Filed June 12, 1922  6 Sheets-Sheet 3
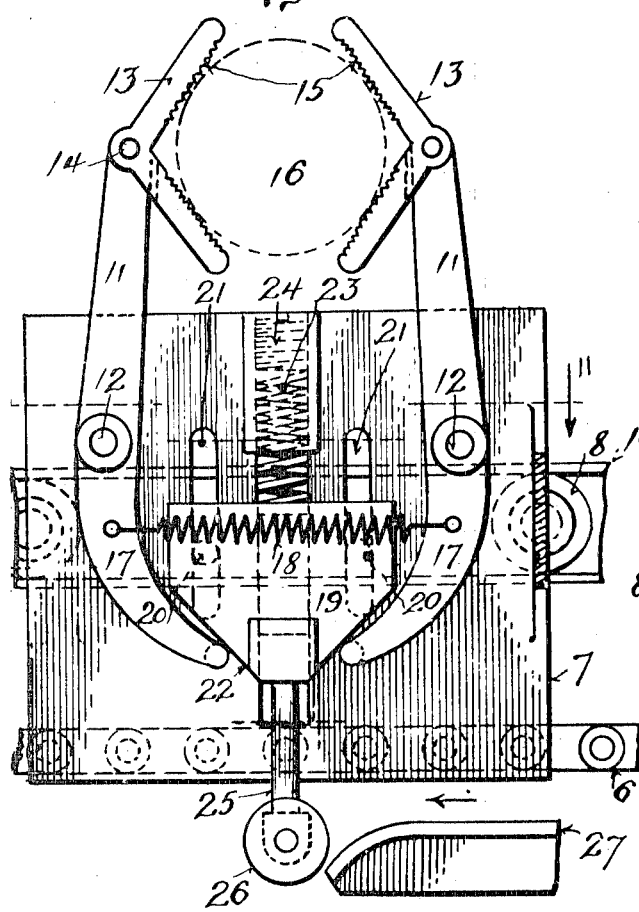
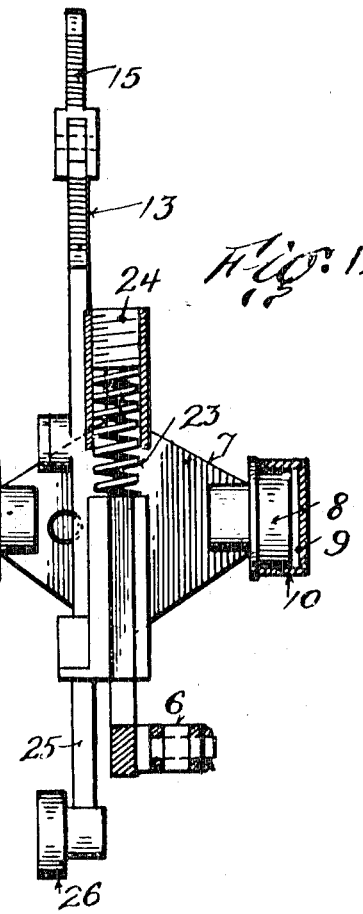
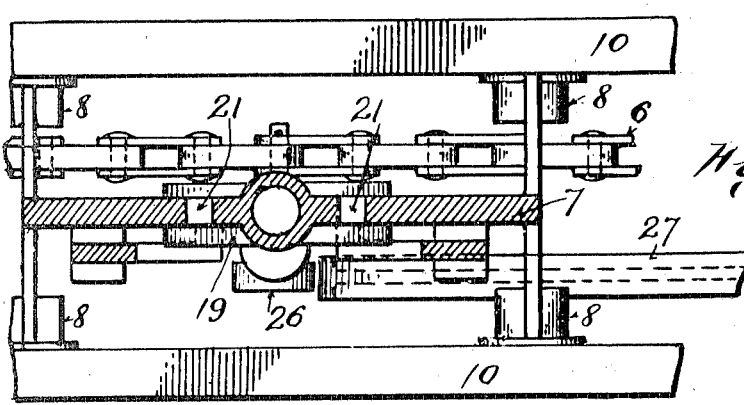
Inventor  
John F. Kohler  
By his Attorney  
Charles G. Hensley Oct. 18, 1927.  
J. F. KOHLER  
1,645,600  
COCONUT SHELLING MACHINE  
Filed June 12, 1922  6 Sheets-Sheet 4
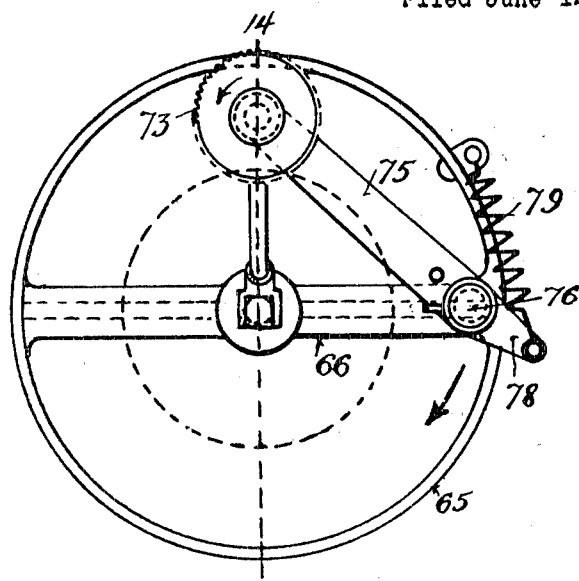
Fig. 13.
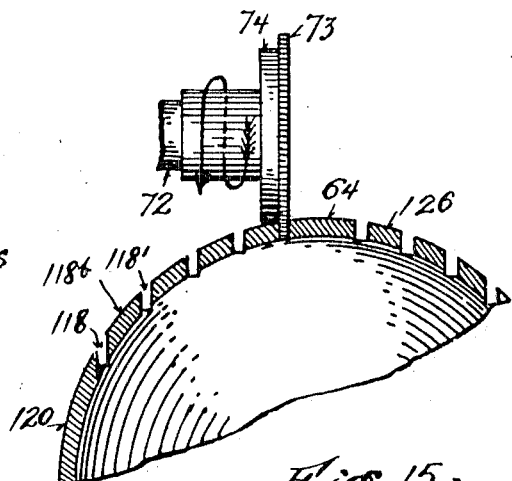
Fig. 15.
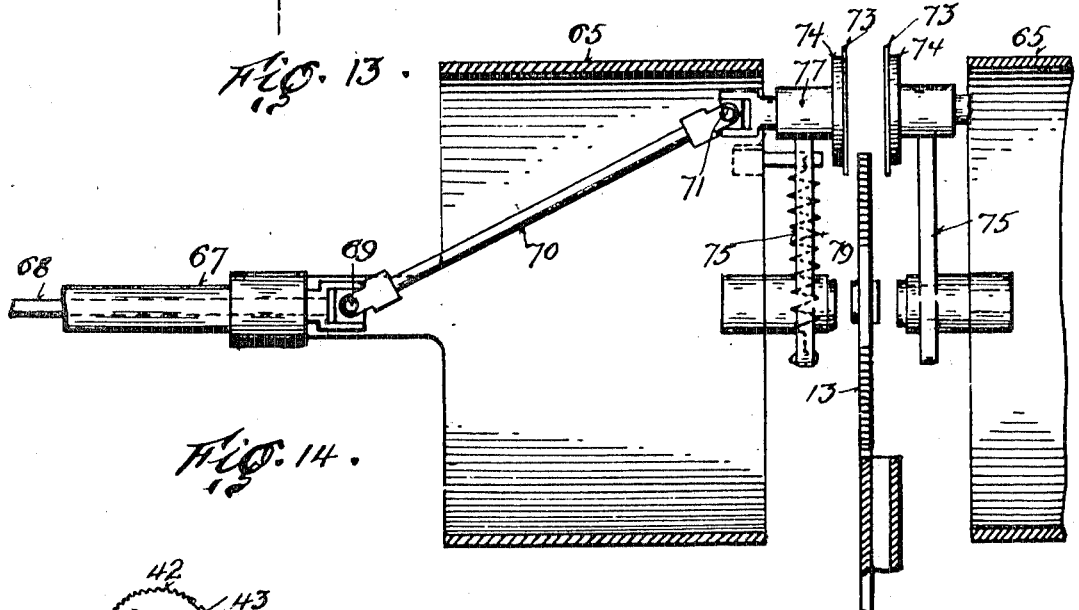
Fig. 14.
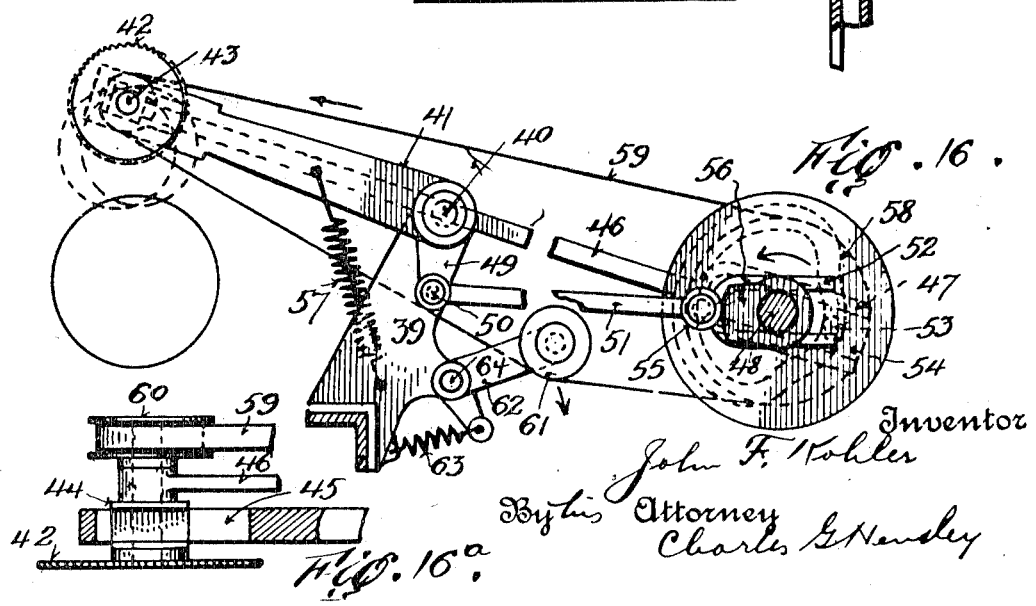
Fig. 16.
Fig. 16a.
Inventor  
John F. Kohler  
By his Attorney  
Charles G. Hensley

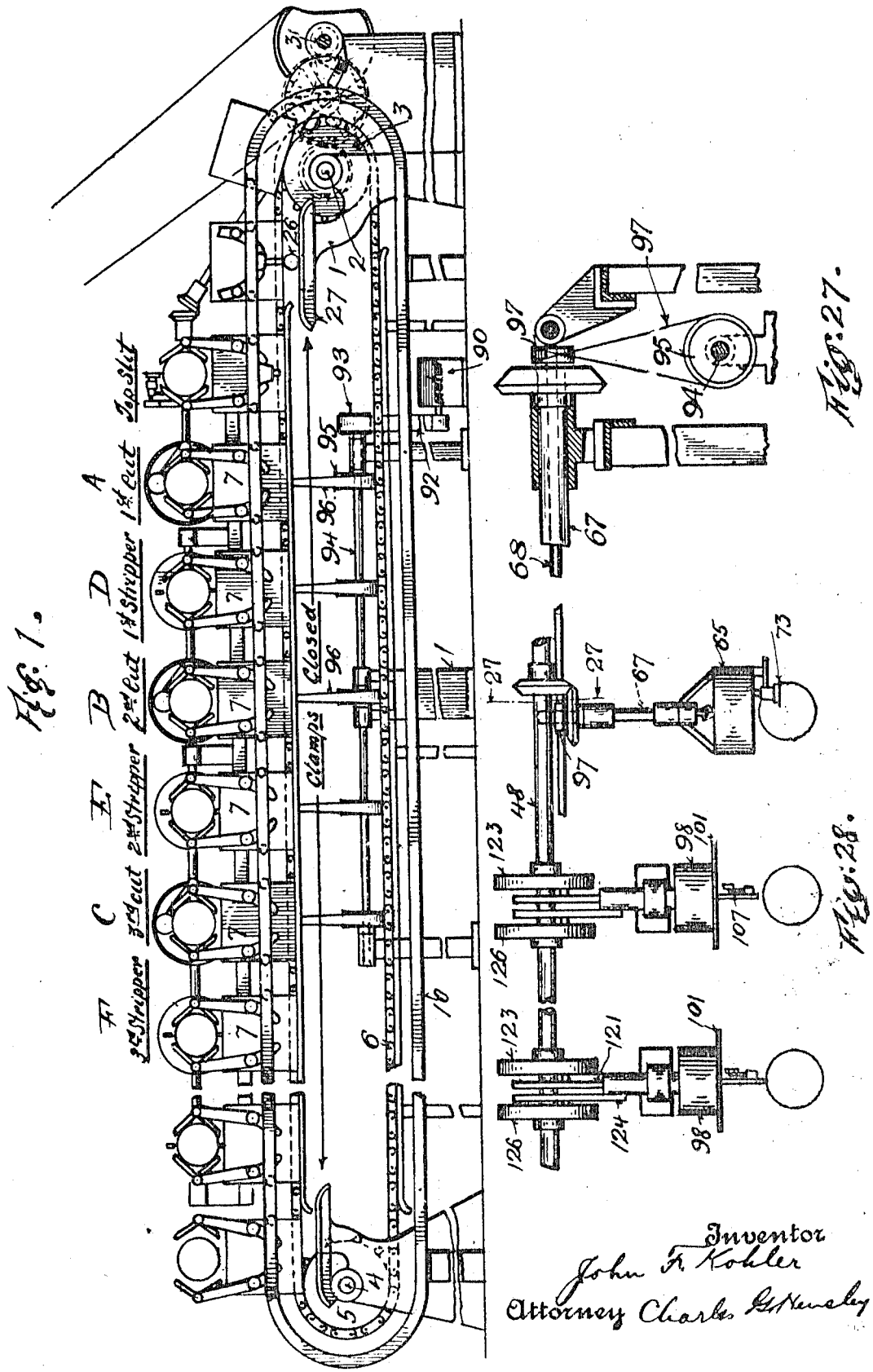

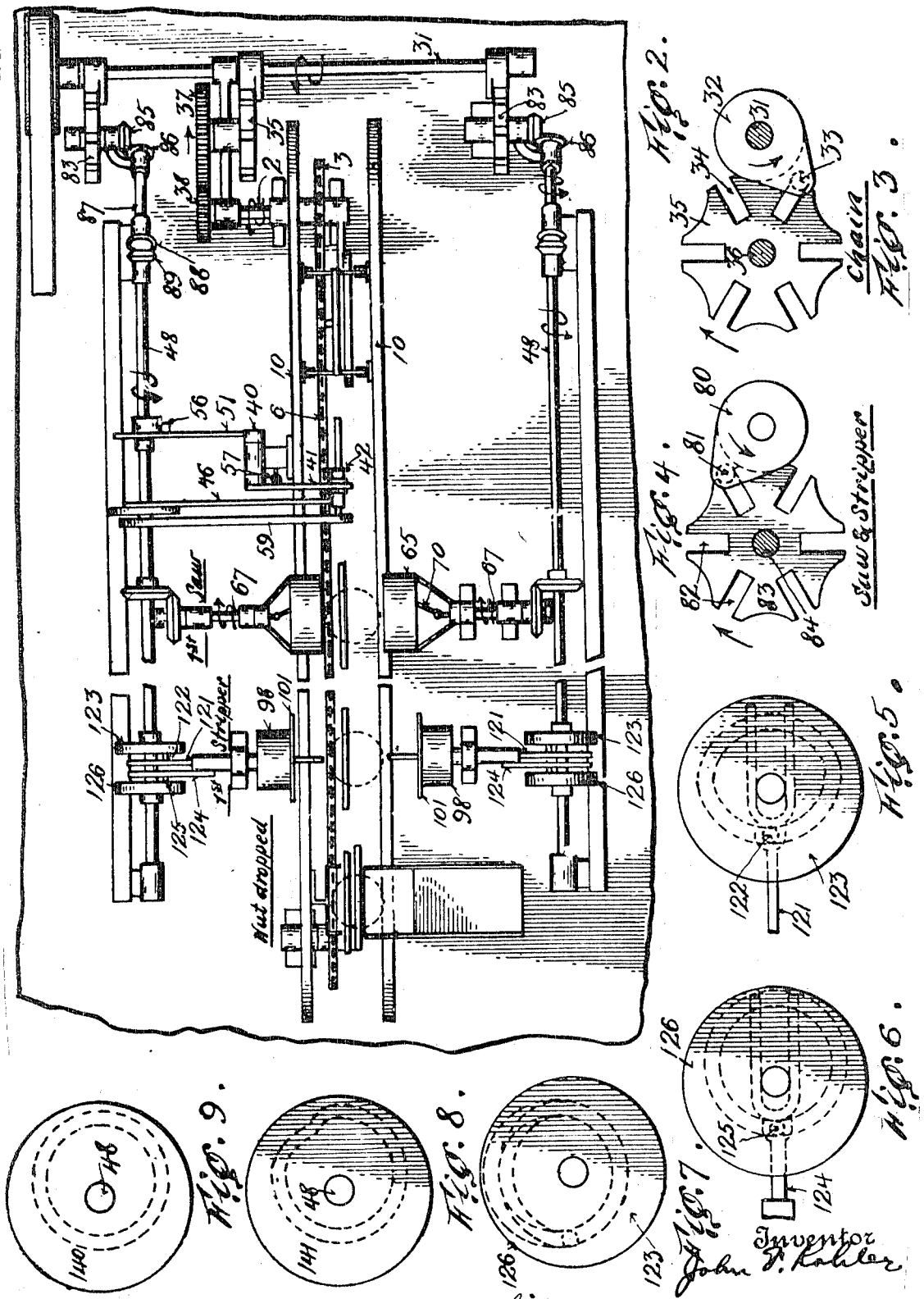

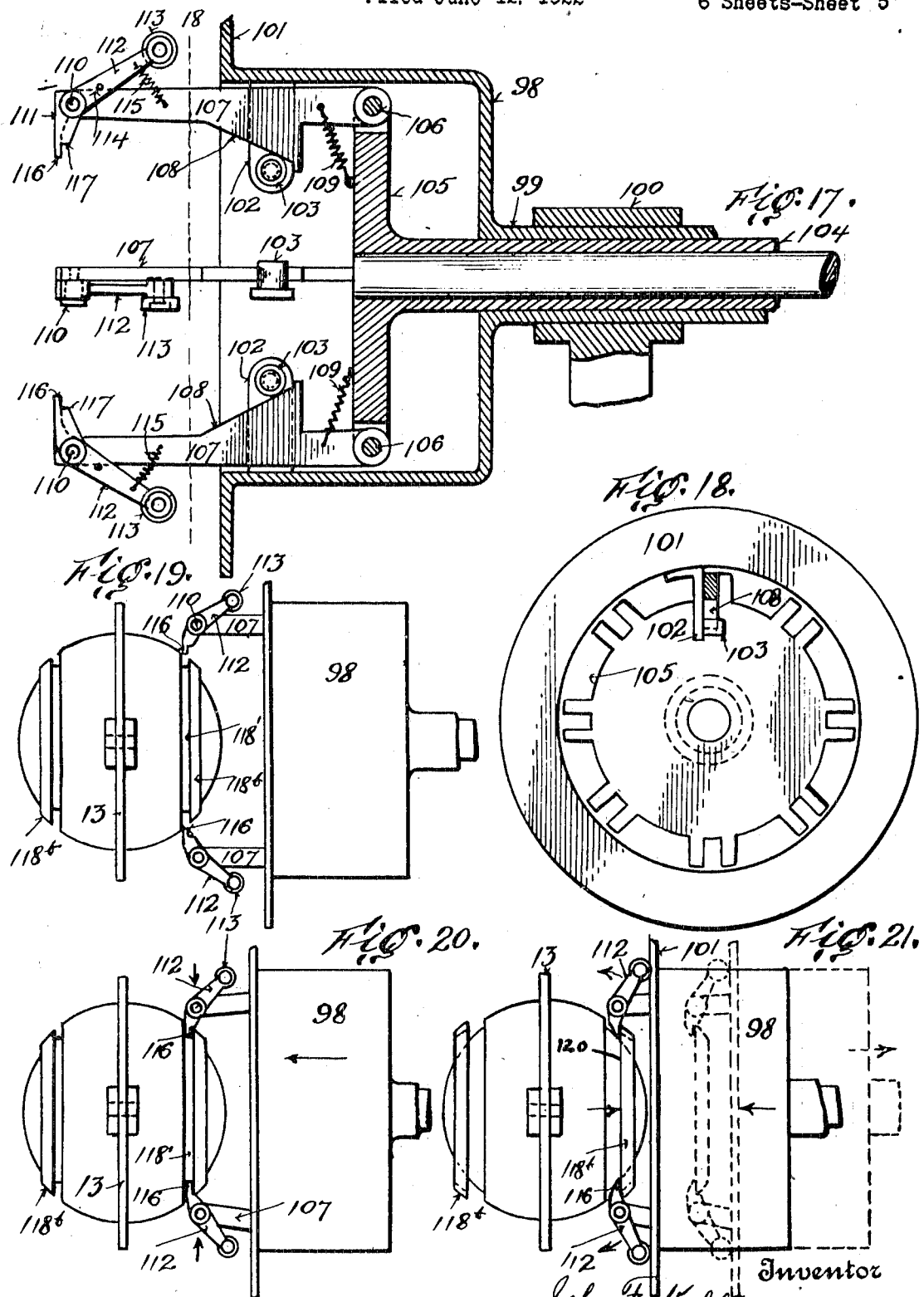

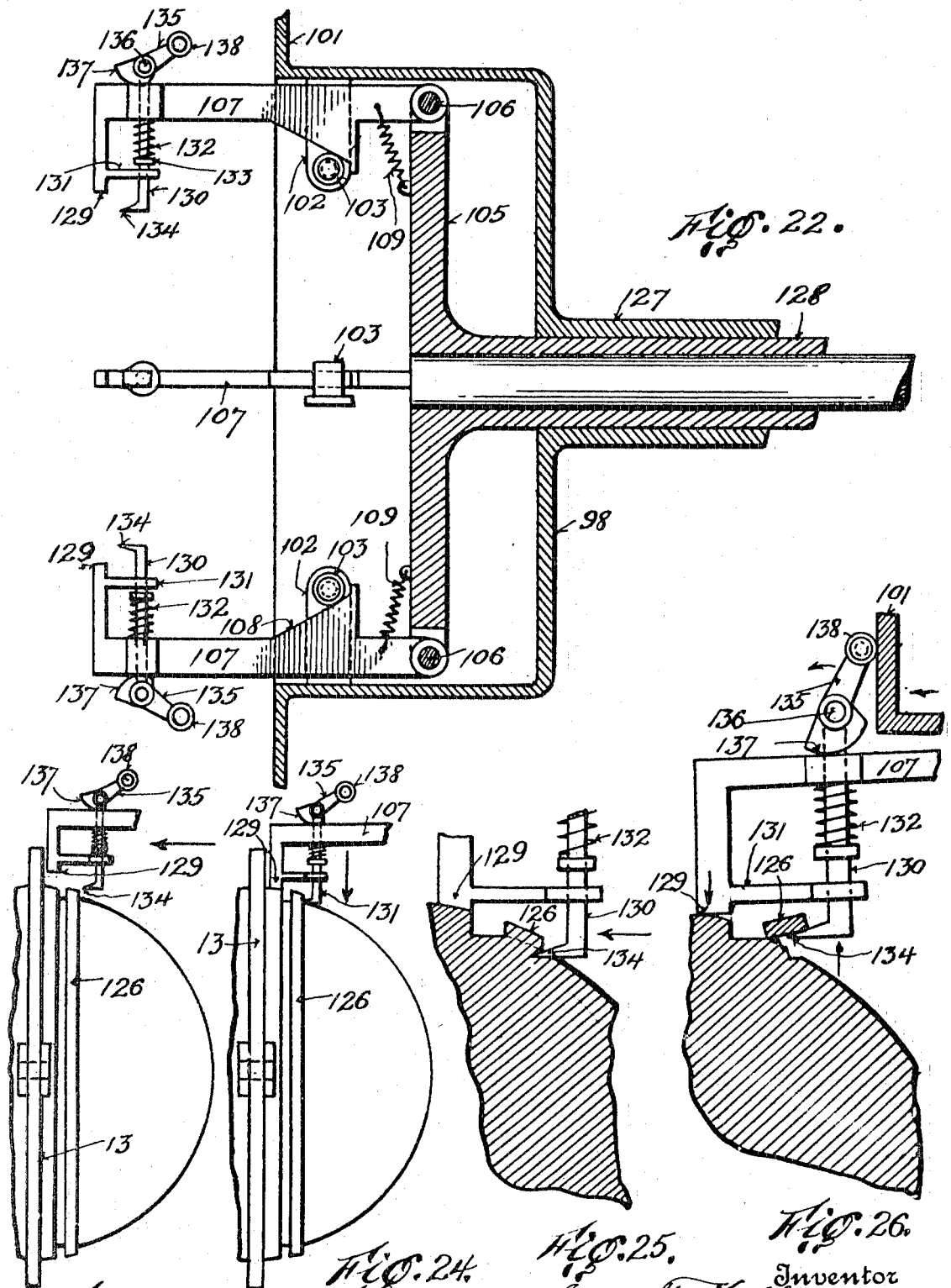

Patented Oct. 18, 1927.

1,645,600

UNITED STATES PATENT OFFICE.

JOHN F. KOHLER, OF LARCHMONT MANOR, NEW YORK.

COCONUT-SHELLING MACHINE.

Application filed June 12, 1922. Serial No. 567,695.

My invention relates to a machine for removing the hard shells from coconuts. The object of my invention is to remove by mechanical means the hard shells from coconuts without injuring in any way the meat or kernel. With the present machine it is possible to remove the hard shells mechanically just as perfectly as the same has been heretofore done by hand, thereby eliminating hand labor for such work and making it possible to perform the work economically in this country. Heretofore, most though not all, of the shelling and dessicating of coconuts has been done in countries where the coconuts are grown on account of the large percentage of hand labor involved and on account of the low cost of labor in such countries. There are many advantages in dessicating in this country and the present invention is intended to make it possible to shell the coconuts here cheaply enough to permit most of the dessicating to be done here for the American market.

There have been several methods proposed for shelling coconuts mechanically, one general plan being to apply striking blows to the shells; but the coconuts are of varying sizes and shapes and there was no reliable way of arresting the blows when the meat was bared. My present machine removes the shell by making a series of cuts around the shell on planes parallel or substantially parallel with the axis of the nut. The axis is a longitudinal line passing through the blossom and stem ends of the coconut. After each cut around the shell the severed or partially severed section is stripped by a pulling or prying action. Where the sections are pried off, the section of the shell still remaining on the nut serves as an abutment for the prying tool. Finally the last section, previously weakened by a cross cut, may be dislodged when released from the gripping members, by hand hand or by a light tap. I have found that where the cuts are made around the shell on planes parallel or substantially parallel with the axis of the nut, that the partially severed sections may be very easily removed from the coconut and without fracturing or breaking the latter, so that the shell may be entirely removed leaving the nut intact.

In the preferred form of machine shown herein the operations are performed in alternate stages; that is, a cut is first made and the partially severed section is removed and then another cut is made and another section is removed etc. In removing the sections they are forced in such a direction in relation to the meat or kernel that these two parts may be separated without breaking the meat. For this purpose, the devices which pry off the first sections operate somewhat differently from the devices which pry off the section of shell following the last circular cut.

Another object of my invention is to provide a machine of the above described type which will readily operate upon nuts of varying sizes and shapes. This is important if not vital because coconuts even from the same sources vary considerably both in size and shape and with the present machine it is not necessary to grade or select the nuts with reference to size or shape as the operating parts of the machine readily adjust themselves to both conditions.

Only one feeding of the nuts to the machine is necessary as once the nuts are placed into the chucks or grippers the several cutting and stripping operations are successively performed before the nut is released from the chucks.

Other advantages will be set forth in the following description.

In the drawings forming part of this application,

Figure 1 is a side elevation of my machine, in which view many of the details of the smaller parts are omitted to simplify the drawing, Figure 2 is a plan view of the machine with parts broken away to simplify the drawing, Figures 3 and 4 are detail views of the Geneva movements for operating the chain conveyor and the saw and stripper devices, Figures 5 and 6 show the cam movements for the first set of shell strippers, Figure 7 is an assembled view showing the relative turning of the cams which are shown in Figures 5 and 6, Figures 8 and 9 are face views of cams for operating another set of strippers, Figure 10 is an enlarged detail view of one of the nut holding devices or chucks, Figure 11 is a sectional view thereof taken on the line 11—11 of Figure 10, Figure 12 is an end view thereof, Figure 13 is an end view on an enlarged scale, of one of the sawing devices, Figure 14 is a longitudinal sectional view taken on the line 14—14 of Figure 13, Figure 15 is a detail view illustrating the way a cut is made by one of the saws, Figure 16 is an enlarged side elevation of the device for making a cross cut in that portion of the shell which is to be removed last, Figure 16ª is a detail view of parts thereof, Figure 17 is an enlarged sectional view of one of the stripping devices, Figure 18 is a sectional view thereof taken on the line 18—18 of Figure 17, Figures 19, 20 and 21 are diagrammatic views showing the stripping device at different stages in the stripping of sections of the shell from the coconut, Figures 22, 23, 24, 25 and 26 are diagrammatic views showing the device for stripping the final section from the nut and they show the different stages of operation, Figure 27 is an enlarged sectional view taken on the line 27—27 of Figure 28, and Figure 28 is a plan view of some of the sawing devices.

In the present case I have shown a conveying device which is moved intermittently and on it are the nut holding devices which receive the nuts and hold them until all the operations have been performed on the shells; and these holding devices are presented successively to the different sawing and stripping devices. For simplicity and for speed I prefer to arrange the saws at both sides of the path of travel of the conveyor and to arrange them in pairs so that saws operate simultaneously on opposite sides of the coconut. After a pair of saws have made their cuts, the conveyor advances a step and the coconut is brought into line with the strippers which are also preferably arranged in pairs and which operate to strip off those sections of the shell which lie outside the lines of cutting.

In the drawings I have shown a frame structure 1 on which the various working parts of the machine are supported. At one end of this frame there is a cross shaft 2 on which there is carried a sprocket wheel 3 and at the other end of the machine there is a cross shaft 4 on which is mounted a sprocket wheel 5. The endless chain 6 travels over these sprockets and it serves to convey the nut holding devices, the chain being advanced intermittently, as will be described later. The nut holding devices are arranged at regular intervals the whole length of this chain and as they are all duplicates a description of one will apply to all.

Each gripping device (see Figures 10–12) is mounted upon a block or frame 7 which is connected to the conveyor chain 6. This block or frame 7 has flanged guide rollers 8 projecting at opposite sides, which engage in the channels 9 in guide rails 10 fixed at opposite sides of the path of the blocks 7 and throughout their whole course of travel. Therefore, while the blocks 7 are propelled by the chain 6 they rest upon and are guided by the rails 10, in order to accurately present the nuts to the several saws and strippers. In each block or chuck frame 7 there is a pair of lever arms 11 pivoted at 12 and carrying at their upper ends the chuck jaws 13 which are pivoted to the arms 11 at 14 and which have angularly disposed, toothed gripping portions 15 for gripping the shell of the coconut 16. The arms 11 are parts of levers and the lower arms 17 of these levers are drawn toward each other by means of the extensible coiled spring 18 which has one end fastened to each arm 17 of the pair of levers. This action of the spring 18 tends to move the arms 11 and therefore the chuck members 13 apart to release the nut or to hold them open while a nut is being placed in the chuck jaws 13. The device for closing the chuck jaws and for holding them closed consists in part of a cam block 19 which is guided by means of the pintles 20 which engage in slots 21 in the frame 7. This block has divergent cam edges 22 which act on the lower ends of the arms 17; and when the block 19 is forced downwardly the edges 22 move the arms 17 apart and this causes the chuck jaws 13 to be moved toward each other to grip the nut between them. The block 19 is forced down by a coiled compression spring 23 which acts downwardly on the cam block and which may be regulated in tension by the adjustable screw 24 against which the upper end of this spring presses.

There is a fixed rod 25 projecting from the block 19 and this has a roller 26 on its free end. When a chuck device passes around the forward sprocket wheel 3 its roller 26 engages the stationary plate 27 and this plate, as the roller 26 rides upon it, lifts the rod 25 and the block 19 against the action of the spring 23 and the lever arms 17 are then drawn closer together by the action of the spring 18. This action spreads the arms 11 and the chuck jaws 13 and the latter are then ready to receive the coconut between them. When the carrier and the frame 7 advances, the roller 26 rides off the plate 27 and the block 19 is then forced down by the spring 23 and the arms 17 are spread apart. This action forces the chuck jaws 13 toward each other so that they grip the coconut which the operator has placed between them. The jaws 13 continue to grip the nut until all operations have been performed upon it. As a frame 7 travels around the rear sprocket 5 and arrives on the bottom run of the conveyor, the roller 26 engages another stationary plate 30; and as it is forced by this plate the block 19 is moved and the arms 17 are again drawn toward each other by the spring 18. This action opens or spreads the jaws 13 and allows the nut to fall out.

It is while the chuck jaws are held open over the plate 27 that the operator feeds a coconut to these jaws and the nut is fed with its major axis or the axis which passes through the stem and blossom ends of the nut, extending lengthwise or in the direction of travel of the conveyor.

The conveyor is moved intermittently, each time a distance equal to the distance between the cutting and stripping devices. For this purpose I have shown a main shaft 31 driven by any suitable power, provided with a revolvable member 32 forming part of a Geneva movement. This member has a pin 33 which engages in a radial slot 34 in the other member 35 of the Geneva movement, and each time the pin 33 engages in one of these radial slots it rotates the member 35 one step or, in the device illustrated, one sixth revolution. This is an ordinary form of Geneva movement and it is to be understood that intermittent movement may be imparted to the conveyor in any other way. On the shaft 36 which carries the disk 35 there is a gear 37 which drives a smaller gear 38 on the shaft 2, and the latter shaft is the one on which the sprocket 3 is mounted. From this it will be apparent that at each revolution of the main shaft 31 the member 32 will revolve the disk 35 part of a revolution; and the motion is transmitted through the gears 37, 38, shaft 2 and sprocket 3 to the chain 6 which forms part of the conveyor.

After the nut has been placed in the chuck, the first advance of the conveyor brings the nut into position for the first operation. In the fullest embodiment of my invention the first operation performed upon the coconut is that of making a cut in the shell at right angles to the axis of the nut or across that part of the shell which is held between the chuck jaws 13 and which remains on the nut until all the circular cuts have been made. The device for making this first or primary cut is shown in Figures 16 and 16ª. There is a bracket 39 attached to the machine frame 1 and on this is pivoted at 40 the swinging arm 41 which carries the circular saw 42 disposed at right angles to the path of travel of the conveyor. The arbor 43 of this saw is mounted in a bearing block 44 which slides in a slot 45 in the carrying arm 41. A rod 46 has one end receiving the saw arbor 43 therethrough and this arm carries a fork 47 which straddles the shaft 48. The arm 49 which is fixed to the lever arm 41 has pivoted to it at 50 one end of an arm or pitman 51. The other end of the latter has a fork 52 which straddles the shaft 48. The fork 47 has a roller 53 which engages in the groove 54 of a cam carried by the shaft 48; and the fork 52 has a roller 55 which is operated on by a cam 56 also carried on the shaft 48. Both forks 47, 52 are therefore reciprocated when the shaft 48 is in motion. The arbor carrying arm 41 is pulled down and the roller 55 is retained against the cam 56 by means of the coiled spring 57 which exerts a pulling action on the arm 41. There is a pulley 58 on the shaft 48 and this pulley operates a belt 59. The latter engages over a smaller pulley 60 on the saw arbor 43 and it also engages over a take up roller 61. The latter is carried on a lever 62 pivoted at 64 to the bracket 39. The other arm of this lever is drawn over by a coiled spring 63.

The pulley 58 operates the belt 59 and this operates the pulley 60 and drives the saw 42 i. e., revolves it. The cam 54 reciprocates the fork 47 and the rod 46 and this reciprocates the bearing box 44 in the slot 45 to move the saw transversely over the top of the nut. The saw is pressed upon the nut by the spring 57 while the cut is being made in the shell of the nut and then the saw is lifted off the nut by the cam 56 acting on the fork 52 and rod 51. The saw makes a cut partially across the top of the nut on that portion of the shell which remains gripped by the chuck until the several operations have been completed. The purpose of this cut is to permit the final ring of shell 64 to be readily broken off the nut.

This saw device acts on the nut just after it is placed in the chuck. When the operation is completed the conveyor advances one step and then the first saw to make a circular cut comes into operation on the shell. This saw device is indicated generally at A. I have shown other similar saw devices at B, C, arranged apart two steps or stages of the conveyor so that at alternate operations of the conveyor the nut is brought into line with the saw devices. In the stages between, the nut is brought into line with the several stripping devices which I have indicated generally at D, E, F. As the saw devices are here shown as of similar construction, differing only in the positions at which they make their cuts on the nut shell, a description of one will answer for all.

Any desired number of saws may be employed but I have found that by making the cuts about one half inch apart the severed sections of the shell may be readily stripped off and the number of saws shown herein will accomplish this.

The saw devices (see Figures 13–15) comprise the following: There is a cylinder 65 carried by the spokes or arms 66 and the latter are fixed to and revolve with a sleeve 67. Inside this sleeve there is a revolving shaft 68 and at 69 there is connected by a universal joint a shaft 70. The other end of this shaft is connected by a universal joint 71 with the arbor 72 which carries the saw 73. The latter has a shoulder 74 to control the depth of cut of the saw into the nut shell. There is an arm 75 pivoted at 76 to one of the cross arms 66. On one end of the arm there is a bearing 77 in which the saw arbor 72 is mounted. The arm 75 forms part of a lever the other arm 78 of which is drawn by a coiled spring 79, the function of which is to swing the arm 75 down and bring the saw to press against the shell of the coconut and to keep it pressed against it regardless of the size of the nut and of irregularities in its shape. The saw 73 is revolved from the shaft 68 through the shaft 70 which, because of the universal joints 69, 71 will follow the position of saw as the arm 75 swings.

Two such saw devices are arranged in axial alignment and in opposed position, as shown in Figure 4, so that the two saws can operate at the same time at opposite sides of the nut. Each cutting or sawing device therefore comprises a pair of the above described arrangements. It will be understood that this arrangement is not imperative but the machine as a whole is more compact where the cutting devices are arranged in pairs in the manner described.

The sleeve or hollow shaft 67 which carries the saw cylinder 65 is driven intermittently from the main shaft 31. On the latter there is one member 80 of a Geneva movement, and it has a pin 81 which engages in one of the radial slots 82 of the disk member 83 of the Geneva movement. The latter is fixed to the shaft 84 and on this shaft there is a mitre gear 85 which operates the mitre gear 86 to drive the inclined shaft 87. On the other end of the latter there is a mitre gear 88 which operates the mitre gear 89 to drive the shaft 48. These parts are duplicated at opposite sides of the machine, as will appear in Figure 4 as the saw devices of the several pairs are similarly operated. The motion here is not very fast. For the shafts 68 of the several saw devices I prefer to use a separate drive as the speed should be high. For this purpose I have shown a separate motor 90 having a pulley 91 which is engaged by a belt 92. The latter also engages around the pulley 93 on the shaft 94. There is a shaft 94 at each side of the machine for the right and left rows of saws. For each saw device there is a pulley 95 on one of the shafts 94 and the belts 96 engage over these pulleys and each belt operates a pulley 97 on the shaft 68 of a cutting device to revolve the saw.

*Strippers.*—These are also arranged in pairs, or in opposed positions and in alignment. The pairs alternate lengthwise of the machine with the pairs of saws. The first form of stripping device is shown in Figures 17 to 21 and is constructed as follows: There is a cylindrical shell 98 carried by the hollow sleeve 99 which slides in the bearings 100; and on the free end of the shell there is an abutment flange 101. The shell 98 has a number of arms 102 arranged near its free or open end and they project inwardly and are each provided with a roller 103. Inside the sleeve 99 there is another sleeve 104 and this carries a plate or disk 105 arranged inside the shell 98. At various positions around this disk there are pivoted at the points 106 the stripper arms 107, each having a cam portion 108 which engages one of the rollers 103; and each arm is held in contact with its roller by a coiled spring 109. On the end of each stripper arm 107 and outside the shell there is pivoted at 110 a stripper finger 111 in the form of a lever, one arm 112 of which has a roller 113 to be engaged by the flange 101 of the shell 98 and a pin 114 to limit the movement of the lever in one direction. The lever 111, 112 is pulled in one direction by the coiled spring 115. The other arm 111 of this lever forms the stripping finger and it has a reduced end 116 which is thin enough to enter the cut made by a saw, with a shoulder 117 to prevent the end from going deep enough to enter the meat of the coconut, thus acting as a guard.

When a nut has been acted upon by a pair of saws to provide a cut encircling the shell of the nut and the nut has been presented in line with a stripping device the latter will operate to strip off the section of shell which has been severed by the cut. For this operation the stripping device first starts from a retracted position or withdrawn axially from the nut. At such time the relative positions of the shell 98 and the disk 105 are such that the arms 107 are held out by the rollers 103 on the cam portions 108 to the position shown in Figure 17. In this open or separated position of the arms 107 the stripper fingers 111 can be passed over a portion of the nut. The sleeves 99, 104 are then moved forwardly by the action of cams to be hereinafter described, the movements of the sleeves at first being at equal speeds, until the fingers 116 are in line or approximately in line with the cut 118' on the shell of the coconut. The sleeve 104 and also the head 105 and the arms 107 stop at this position and the sleeve 99, together with the shell 98 continue to move in the direction of the arrow in Figure 20. Figure 19 shows the position of the parts when the sleeve 104 stops and Figure 20 shows the sleeve 99 continuing its movement. As the sleeve 99 advances after the sleeve 104 has stopped, the cam edges 108 ride down on the roller 103 and the arms 107 are drawn inwardly by the springs 109 until the fingers 116 engage in the saw cut of the nut shell, as is shown in Figure 20. Following this, the flange 101 will come up against the rollers 113 and as the sleeve 99 continues to advance, the levers 111, 112 are rocked. The fingers 116 will pry against the edge of the section 120 of shell which is outside of or beyond the line of cut, purchase occurring also against the edge of the remaining portion of the shell. This action continues until the section 120 of shell is pried off the nut; and after that the sleeves 99, 104 are retracted to permit the nut to be conveyed away and to permit another one to be brought into position. These operations are repeated. When the sleeves 99, 104 retract, the fingers 116 disengage from the nut and they swing out with the arms 107 as the cam portions 108 ride upon the rollers 103.

The cams for operating the sleeves 99, 104 are shown in Figures 5, 6. The rod 121 connected with the sleeve 104 has a pin or roller 122 engaging in the groove of the cam 123 shown in Figure 5, whereby the sleeve 104 is advanced and retracted. There is an arm 124 connected with the sleeve 99 and this has a roller or pin 125 which engages in the groove of the cam 126. The groove of these cams are so shaped that the movements of the sleeves will be in the order described above.

For the final stripping I prefer to use a somewhat different form of device in order to pry off the shell sections 126 at the proper angle to prevent tearing the meat of the nut. This device is shown in Figures 22 to 26 and is constructed as follows: The sleeve 127 corresponds with the sleeve 99 in the foregoing description and it has the flange 101 thereon. It also has the arms 102 carrying the rollers 103. The inner sleeve 128 has the head 105 to which the radially rocking arms 107 are pivoted at 106 and these are the same as in the first construction, being also provided with the cam portions 108 engaging the rollers 103 and having the springs 109 to draw the arms inwardly. The outer end of the arm 107 is turned down to provide an abutment or purchase member 129 adapted to press against the shell of the nut inside the last line of cutting. There is a plunger 130 sliding in an aperture of each arm 107 and it is guided in a bracket 131 extending from the member 129. This plunger 130 is forced downwardly by a coiled spring 132 which is compressed between the arm 107 and a collar 133 on the plunger 130. The lower end of the plunger has a laterally directed stripping tool or finger 134. There is a rocking lever 135 pivoted at 136 to the upper end of each plunger 130 and this lever has an eccentric or cam portion 137 which rocks on the top surface of the arm 107. The rollers 138 one on each lever 135, are operated upon by the flange 101.

The sleeves 127, 128 are operated by means of the cams shown in Figures 8 and 9. The arm 121 attached to the sleeve 127 has a pin which engages in the groove of a cam 140 on the shaft 48, whereby the sleeve 127 and the cylinder 98 are advanced and retracted. There is another arm 124 which is attached to the sleeve 128. The pin 122 on this fork engages in the groove of a cam 141 on the shaft 48. The cam 141 serves to advance and retract the sleeve 128 and the head 105 carried by it.

In the operation of this stripping device the sleeves 127, 128 are both advanced to the left in Figure 22, until the stripper fingers 134 are about in line with the outer edge of the final ring 126 of the shell. The sleeve 127 then advances and the abutment member 129 comes against the uncut section of the shell and the fingers 134 dig in under the edge of the shell ring 126 to the position indicated in Figure 25. The sleeve 127 and the cylinder 98 continue to advance, whereupon the flange 101 contacts with the several rollers 138 and then the levers 135 are rocked. This forces the plungers 130 outwardly or away from the coconut, the counter-purchase acting through the abutment members 129 on the solid portion of the nut shell. The fingers 134 which engage under the edge of the shell ring 126, force upwardly on this ring, and they break the ring and also force or strip it away from the meat as shown in Figure 26. This form of stripper is preferably used on the last rings to be removed from the nut in the machine in order to strip this section away from the meat in the proper direction. The first rings may be better stripped by the first described strippers because the angle of stripping there should be laterally rather than outwardly.

*Operation.*—The conveyor is advanced step by step, each time being moved a distance equal to the distance between one of the pairs of saws and the adjacent pair of strippers. The operator will feed a coconut into the chuck device at the right of the machine in Figure 1 or into the chuck device which has stopped over the plate 27. The jaws of this chuck are held open by the plate 27 acting on the roller 26 and holding up the cam block 19, thus allowing the arms 11 to be drawn open by the spring 18. The coconut is placed between the pair of jaws 13 with the major axis of the nut or the axis passing through the stem and blossom ends of the nut extending in the direction of the conveyor, so that the ends are engaged by the jaws 13. As the conveyor advances one step, the roller 26 rides off the plate 27 and the jaws 13 are clamped upon the nut by the action of the cam block 19 which is forced down by the spring 23. The nut will remain clamped in the chuck until all the operations have been completed, so that the nut is fed but once in the machine by hand. As the conveyor makes its first movement forward the chuck with the nut stops in line with the top slitting saw 42. This saw, shown in Figure 16, then comes down on the shell of the nut and as the rapidly revolving blade is drawn across the top surface of the shell a cut is made at right angles to the axis of the nut and across that portion which lies between the jaws 13. This is to permit the final ring of shell to be readily broken off after the nut is discharged by the machine. The cut made by this saw is preferably regulated so that the saw does not pass entirely through the shell, or at least it does not enter the meat. As the shells vary in thickness the cut may be regulated for the thinnest shells.

The carrier now advances another step and the first nut is moved up into line with the first pair of saws which make the circumferential cuts. The saws are disposed on opposite sides of the nut but as they operate exactly alike on opposite sides of the nut I may describe the operation of one only. The saw blade 73 is rapidly revolved by the power derived from the motor 90 and which is transmitted to the shaft 68 and thence through the shaft 70 to the arbor 72 of the saw 73. When the nut comes to rest with the saw blade pressing against the shell, the cylinder 65 begins to revolve and it makes one complete revolution, under the action of the Geneva movement shown in Figure 4. As the saw rotates around the nut it is held in contact with it by the pull of the spring 79 which draws the lever 75, 78 and holds the saw blade against the shell regardless of any irregularities in the size and shape of the nut. The depth of cut made by the saw is determined by the shoulder 74 which acts as a guard against the shell. It is preferable that the depth be regulated so that the saw will barely cut through the thinnest shells and in that case the blade will not pass through thicker portions of the shell but the cut will be sufficiently deep to permit stripping. The saw moves in a circular or nearly circular path, the plane of which is parallel or substantially parallel with the axis of the nut and the cut made by the first saw is lettered 118 in the drawings. The piece of shell 120 outside this cut will have the general shape of a convex disk. The same action takes place with the other saw of the pair on the opposite side of the nut. Therefore, when the saws of the first pair have moved around their orbits there will be a convex disk 120 on each side of the nut defined by the first cuts 118.

When the saws have made a complete revolution the carrier is advanced another step and the nut moves into position between the first pair of strippers and a new nut moves up to the first pair of saws; but I will trace only the action of the first through the machine as all the others go through the same operations in sequence.

As the first nut stops between the first pair of strippers the latter comes into action on the shell. As the strippers perform the same operation at each side reference may be had to one of them (see Figures 17–21). The sleeves 99, 104 advance until the fingers 116 come into line with the cut just made by the first saw and the sleeve 104 and the head 105 then stop. The cylinder 98 continues to advance, and the rollers 103 move along the cam surfaces 108 so that the arms 107 are drawn inwardly by the springs 109 until the fingers 116 enter the saw cut 118. The cylinder 98 continues to advance until the flange 101 acts on the rollers 113 and forces the stripper fingers 116 to rock on their pivots 110. These fingers pry off the disk 120 of shell lying outside the first cut 118 and this disk is removed without injury to the meat. The cylinder 98 then retracts, the arms 107 are swung out by the rollers 103 and then the head 105 and the sleeve 104 retract until the device is free of the nut.

The carrier now advances another step and the nut is stopped in line with the second pair of saws. The second pair of saws is so located that it operates on the shell on a line nearer the axis of the nut. I have found that if each cut is spaced to come about one-half inch nearer the axis than a preceding cut that the section of shell partially severed may be readily stripped. The second pair of saws operates like the first set only it is positioned to make the cuts nearer the axis of the nut than the first cuts. When the second pair of saws has made a complete circle around the nut and completed the circular cuts 118' the carrier will be advanced another step and the nut will be brought into line with the second pair of strippers. These will then advance into position over the nut and this position will be nearer the axis of the nut than the position of the first pair of strippers. The fingers 116 of the second pair of strippers will engage in the second saw cuts 118' and they will operate to strip off the ring of shell 118$^b$.

The carrier will advance in stages or steps and the several saws will each operate in succession in the above manner, each successive pair of saws cutting slots nearer the axis of the nut; and each successive pair of strippers will strip off the rings of shell outside the several cuts. After the last cuts have been made by the last set of saws the carrier advances one step and the shell is then operated upon by the stripping device shown in Figures 22 to 26. In this form of device the fingers 134 engage one edge of the rings 126 and pull upwardly to break this ring and strip it from the nut. This action is preferable here in order that the stripping action will be in the right direction to strip the shell without breaking the meat.

When the last stripping devices have performed their operation the nut will still be gripped by the jaws 13 since the ring of shell 64 will still remain on the nut. When the carrier moves the nut away from the last strippers it will be carried around the sprocket wheel 5 and when the chuck device moves around to the lower run of the carrier chain the roller 26 will engage the plate 30 and the cam block 19 will be raised to permit the lever arms 11 to spread; and the nut will then fall out of the chuck. The remaining ring of the shell 64 will have the cross cut made by the top cutting saw 42 and this ring may be readily broken off the nut by hand.

I have found that where the saw cuts are made around the nut in planes which are parallel or nearly parallel with the axis of the nut that the sections of shell released by the saw cuts may be readily stripped off without tearing the meat apart so that when the operations have been completed the meat of the nut remains intact If the depth of cut is regulated to conform to the thinnest shells the saws will not penetrate the meat. In thicker portions of shells the saws will not cut entirely through but the cut will be sufficiently deep for the strippers to remove the partially severed ring entirely from the meat.

It will be apparent that after several nuts have been fed into the machine the several cutting and stripping devices will operate simultaneously on different nuts and that a shelled nut will be discharged from the machine every time a nut is fed to it.

It will be obvious that the several cutting devices may be arranged in succession and then the several stripping devices may be arranged in succession following all the cutting devices but the arrangement here shown is preferable because the stripping fingers while acting on the severed ring may purchase against the solid or uncut portion of the shell.

Having described my invention what I claim is:

1. In a nut shelling machine, means for holding the nut, means for making a plurality of cuts encircling portions of the shell of the nut on planes substantially parallel with the axis of the nut, said cuts being spaced progressively nearer the axis of the nut and means for engaging in the several cuts and adapted to strip off the sections of shell lying outside said cuts.

2. In a nut shelling machine, means for holding the nut, means for making a plurality of cuts encircling portions of the shell of the nut on planes substantially parallel with the axis of the nut and with each other, said cuts being disposed on opposite sides of the axis of the nut, and means for engaging in the several cuts and adapted to strip off the sections of shell lying outside said cuts.

3. In a nut shelling machine means for holding the nut, means for making a cut encircling a portion of the shell of the nut on a plane substantially parallel with the axis of the nut, and means for engaging in said cut and adapted to strip off the section of nut lying outside said cut, said means during the stripping operation pressing against the portion of shell lying inside said cut.

4. In a nut shelling machine, means for holding the nut, means for successively making a plurality of cuts around portions of the shell of the nut, and stripping means for individually stripping the sections of shell from the nut following each cutting operation.

5. In a nut shelling machine, means for holding the nut, means for successively making a plurality of cuts around portions of the shell of the nut, on planes lying substantially parallel to the axis of the nut and stripping means for individually stripping the sections of shell from the nut following each cutting operation.

6. In a nut shelling machine means for holding the nut, means for successively making a plurality of cuts around portions of the shell of the nut on both sides of the axis of the nut, said cuts being in planes substantially parallel with the axis of the nut and stripping means for individually stripping the sections of shell from the nut on each side thereof and following each cutting operation.

7. In a nut shelling machine means for holding the nut, means for successively making a plurality of cuts around portions of the shell of the nut simultaneously on both sides of the axis of the nut, said cuts being in planes substantially parallel with the axis of the nut; and stripping means acting simultaneously on both sides of the nut for stripping the sections of shell from the nut following each cutting operation.

8. In a nut shelling machine means for holding the nut, means for making a plurality of cuts encircling portions of the shell of the nut, means for stripping the sections of shell from the nut, and means moving intermittently for successively presenting the nuts to said cutting and stripping means.

9. In a nut shelling machine an intermittently moving carrier, a plurality of nut holding means on said carrier, means for successively making a plurality of cuts around portions of the shell of the nuts and means for stripping the sections of shell from the nuts, said cutting and stripping means being arranged to operate successively upon the nuts as they are presented by said carrier.

10. In a nut shelling machine an intermittently moving carrier, a plurality of nut holding means on said carrier, means at each side of said carrier for successively making a plurality of cuts around portions of the shells of the nuts and in planes substantially parallel with the axes of the nuts and means for stripping the sections of shell from the nuts, said cutting and stripping means being arranged to operate sucessively upon the nuts as they are presented by said carrier.

11. In a nut shelling machine, means for gripping the ends of a nut to hold it, a saw arranged to make a cross cut in the shell of the nut and between said gripping means, means for making cuts around the nut substantially parallel to its axis and means for stripping off the sections of shell released by said latter cuts.

12. In a nut shelling machine means for sawing sections of the shell of the nuts, means for stripping off the sections of the shell and a carrier for holding and conveying the nuts in relation to said cutting and stripping means, chucks on said carrier for gripping the nuts, resistable means for closing the chuck on the nut, and means for automatically opening said chuck.

13. In a nut shelling machine means for sawing sections of the shell of the nuts, means for stripping off the sections of the shell, and a carrier for holding and conveying the nuts in relation to said cutting and stripping means, chucks on said carrier for gripping the nuts, resistable means for closing the chuck on the nut, means for automatically opening the chucks to receive a nut to be conveyed to said cutting and stripping means, and means for opening the chucks to release the nuts after they have been acted upon by the cutting and stripping means.

14. In a nut shelling machine means for sawing sections of the shell of the nuts, means for stripping off the sections of the shell, and a carrier for holding and conveying the nuts in relation to said cutting and stripping means, a frame on said carrier, arms pivoted to said frame and provided with chuck jaws to grip the nut, a spring pressed member for operating said arms to close said jaws, and means for automotically opening said chuck jaws.

15. In a nut shelling machine means for holding a nut, means for making a circumferential cut around a portion of the nut shell, and means for stripping the section of shell from the nut, comprising a reciprocating support having pivoted, radial arms, pivoted fingers carried by said arms and adapted to enter said cut at different points, said arms having cam portions, and springs for drawing said arms to move the fingers into said cut and a reciprocating member for acting on said cam portions of said arms to disengage said fingers from the nut.

16. In a nut shelling machine means for holding a nut, means for making a circumferential cut around a porton of the nut shell, and means for stripping the section of shell from the nut, comprising a reciprocating support having pivoted, radial arms, pivoted fingers carried by said arms and adapted to enter said cut, said arms having cam portions, and springs for drawing said arms to move the fingers into said cut, a reciprocating member for acting on said cam, portions of said arms to disengage said fingers from the nut and adapted to rock said fingers while penetrating said cut.

17. In a nut shelling machine means for holding a nut, means for making circumferential cuts around portions of the nut shell, and means for stripping a section of shell from the nut comprising fingers, means for projecting the fingers under the edge of a section of shell lying outside one of said cuts so that the finger enters between the shell and kernel, and means for moving said fingers outwardly away from the nut to strip off the section of shell.

18. In a nut shelling machine means for holding a nut, means for making circumferential cuts around portions of the nut shell, and means for stripping a section of shell from the nut, comprising pivoted arms, springs for moving them toward the nut, abutments on said arms for engaging the shell inside a cut, fingers adapted to engage under the edge of the section of shell outside one of said cuts means for forcing said fingers under the edge of the section of shell and means for forcing said fingers outwardly from the nut to strip said shell section from the nut.

19. In a nut shelling machine, means for holding a nut and for presenting it successively to different saws, a plurality of saws arranged to make successive cuts encircling portions of the nut on planes parallel with the axis of the nut, said saws being arranged to opperate at relatively different distances from the axial plane of the nut, and means for operating said saws.

20. In a nut shelling machine, the combination of means for holding a nut and for presenting the nut successively to a plurality of sawing devices, a plurality of saws arranged to operate at different distances from the axial plane of the nut, and means for revolving said saws and for rotating them around portions of the nut to form cuts in the shell of the nut on planes parallel with the axis of the nut.

Signed at the city, county and State of New York, this 15th day of March, 1922.

JOHN F. KOHLER.